United States Patent [19]

Elkins

[11] 4,290,192
[45] Sep. 22, 1981

[54] METHOD OF MAKING A SODIUM SULFUR BATTERY

[75] Inventor: Perry E. Elkins, Santa Ana, Calif.

[73] Assignee: Ford Motor Company, Dearborn, Mich.

[21] Appl. No.: 105,848

[22] Filed: Dec. 20, 1979

[51] Int. Cl.³ .................... H01M 10/38; H01M 10/39
[52] U.S. Cl. .................................. 29/623.5; 29/447; 429/104
[58] Field of Search .................. 29/623.1, 623.5, 447, 29/DIG. 35; 429/104, 176

[56] References Cited

U.S. PATENT DOCUMENTS

| | | | |
|---|---|---|---|
| 541,507 | 6/1895 | Sellers | 29/DIG. 35 |
| 669,117 | 3/1901 | Judd | 29/447 |
| 1,930,277 | 10/1933 | Lenz et al. | 29/447 |
| 2,874,007 | 2/1959 | Cametti et al. | 29/447 |
| 3,332,774 | 7/1967 | Tuttle | 29/149.5 PM |
| 3,370,947 | 2/1968 | Talmage | 29/149.5 PM |
| 4,146,684 | 3/1979 | Fischer et al. | 429/104 |
| 4,216,275 | 8/1980 | Hartmann et al. | 429/176 |

Primary Examiner—Daniel C. Crane
Attorney, Agent, or Firm—William E. Johnson; Olin B. Johnson

[57] ABSTRACT

A method of making a portion of a sodium sulfur battery is disclosed. The battery portion made is a portion of the container which defines the volume for the cathodic reactant materials which are sulfur and sodium polysulfide materials. The container portion is defined by an outer metal casing with a graphite liner contained therein, the graphite liner having a coating on its internal diameter for sealing off the porosity thereof. The steel outer container and graphite pipe are united by a method which insures that at the operating temperature of the battery, relatively low electrical resistance exists between the two materials because they are in intimate contact with one another.

3 Claims, 3 Drawing Figures

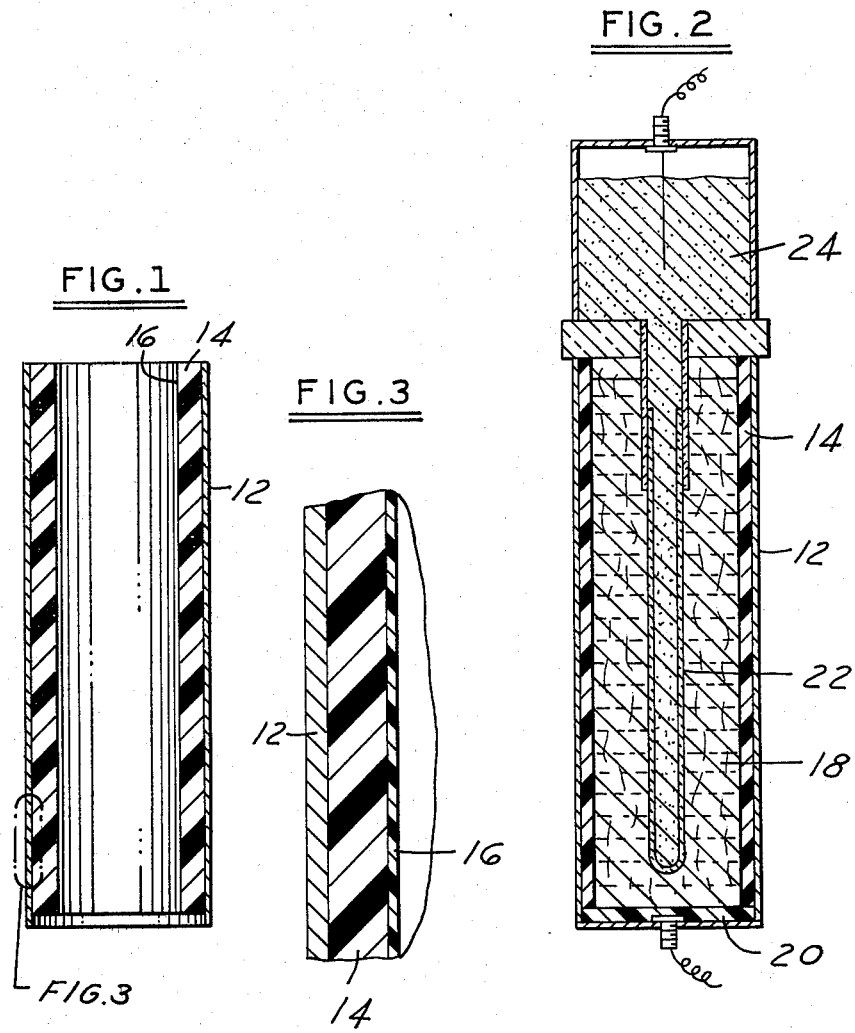

METHOD OF MAKING A SODIUM SULFUR BATTERY

STATEMENT

The invention herein described was made in the course of or under a contract or subcontract with the Department of Energy No. EY-76-C-02-2566.

BACKGROUND OF THE INVENTION AND PRIOR ART STATEMENT

This invention relates to a method of making a container portion for a sodium sulfur battery in which the elements used are readily available on the commercial market. The method involves the expanding of an outer steel casing in a heating operation so that the casing may be slipped over an inner graphite pipe. Upon cooling, the steel casing shrinks into intimate contact with the graphite pipe.

A novelty study was conducted on the subject matter of this disclosure in the U.S. Patent Office. While the study resulted in the citation of several patents relating to sodium sulfur battery constructions, none of the patents so cited showed a sodium sulfur battery construction in which a heated outer steel casing was subsequently shrunk into engagement with an inner graphite pipe as part of the method of making a portion a container for such a battery.

U.S. Pat. No. 541,507 was cited in the search report. This patent was entitled "Breach Loading Ordinance and Art of Assembling or Disassembling Parts of Same." On page 2, commencing at line 50, the patent describes the process of making guns in which various elements are heated and then shrunk about an unheated element.

The prior art cited does not appear to be of interest with respect to the method of this invention because it does not show shrinking of an expanded steel casing about an inner graphite pipe, that graphite pipe originally being porous in nature. The art also does not teach a subsequent sealing of the porosity of the graphite pipe so that it is not attacked by the molten sodium polysulfide materials which come in contact therewith during operation of the battery.

It is a principal object of this invention to provide a portion of a container for a sodium sulfur battery in which an outer metal casing is brought into contact with an inner graphite pipe in such a manner that under normal operating conditions of the battery, a low electrical resistance path is provided between the outer metal casing and the cathode compartment of the battery.

It is a further object of this invention to provide such a method which uses materials which are readily available on the commercial market.

SUMMARY OF THE INVENTION

This invention relates to a method of making a container portion for a sodium sulfur battery and, more particularly, to the making of that portion of a sodium sulfur battery which confines therein the sodium polysulfide materials generated or depleted during operation of the battery. The method of this invention produces a container portion which can not only confine the very corrosive sodium polysulfide materials, but also is one which provides a low electrical resistance path from the container to an external circuit.

In accordance with the teachings of this invention, a portion of a container for a sodium sulfur battery is made as follows. A steel pipe having a predetermined inside diameter is selected. A graphite pipe having an outside diameter greater than the predetermined inside diameter of the steel pipe is also selected. This graphite pipe is generally made from a porous graphite material. The outside diameter of the graphite pipe is machined to a diameter in the range of 0.005 inches to 0.010 inches greater than the predetermined inside diameter of the steel pipe. The steel pipe is heated so as to expand the same so that the inside diameter is greater than the predetermined inside diameter. The heated steel pipe is slipped over the machined graphite pipe. The heated steel pipe is allowed to cool back to room temperature so that the inside diameter of the steel pipe comes into intimate contact with the machined outside diameter of the graphite pipe. The inside diameter of the graphite pipe is machined to reduce the thickness of the graphite pipe to a selected final thickness. The inside diameter of the porous graphite pipe is coated with a sealant material to close off the porosity of the graphite pipe from its internal diameter outwardly toward the outlying steel pipe.

The container portion made as described above may then be assembled with other components in order to form a finished sodium sulfur battery. The container portion formed as described by the method of this invention generally provides the housing in which the cathodic reactant material is confined. During discharge of the battery, the cathodic reactant has sodium ions migrating into the same to react therewith and to form sodium polysulfide materials. As is well known in the art, the sodium polysulfide materials are extremely corrosive. It has been found that by using the sealed graphite pipe liner as disclosed by this disclosure to confine the molten polysulfide materials, a high degree of corrosion resistance for this portion of the battery is provided.

I have also found that by carrying out the method of this invention the graphite pipe is in excellent electrical connection with the outer steel pipe so that there is a low resistance electrical path from the sulfur cathode compartment to the outer current collector for the battery.

BRIEF DESCRIPTION OF THE DRAWINGS

The novel features that are considered characteristic of the invention are set forth with particularlity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is an elevation view, in cross-section, showing an assembly made to define a portion of a sodium sulfur battery in accordance with the teachings of this invention;

FIG. 2 is an elevation view, in cross-section, showing a sodium sulfur battery made using the sulfur containing portion made in accordance with the method of this invention; and FIG. 3 is an enlarged area of FIG. 1 showing greater details of the structure of FIG. 1.

DESCRIPTION OF THE PREFERRED EMBODIMENT

The method of this invention teaches one how to construct a container portion for a sodium sulfur battery. This particular container portion is designed primarily to confine rather corrosive sodium polysulfide materials for extended periods of time. At the present time, there are generally three materials which are known for preventing the corrosive attack of sulfur and sodium polysulfide materials in the 300° C. to 400° C. temperature range. These materials are graphite, molybdenum and chromium. A plain AISI 1018 steel container will last only about one month of service when its surface is protected by a coating of graphite, molybdenum or chromium which is bonded to the metal. More costly vacuum melted 400 series stainless steels, similarly protected, last a short time longer, for example, one or two additional months of service life. It is readily apparent that if the sodium sulfur battery system is to be commercially feasible, containers must be found for the corrosive material which will provide a prolonged service life for the battery. The service life must be in the order of years.

A major problem in the use of a graphite liner inside an AISI 1018 steel container is to maintain good electrical contact between the metal outer casing and the graphite liner. This contact must be sufficiently good under cell operating conditions to insure a low electrical resistance path from the sulfur cathode compartment to the outer current collector. Such a condition is usually difficult to achieve because the liner expansion of graphite is $1.7 \times 10^{-6\circ}$ C. and that of steel is $11.7 \times 10^{-6\circ}$ C. Thus, if one bonds a graphite liner into a steel container at room temperature, the bond will shear on heating to 350° C. and a high electrical resistance will develop across the graphite/metal interface, thereby destroying the electrical characteristics of the sodium sulfur battery.

It is a principal object of the method of this invention to provide a container portion for a sodium sulfur battery in which very good contact is achieved between a graphite liner and an outer metal casing at operating temperatures of the sodium sulfur battery. This excellent contact provides a low electrical resistance path from the sulfur cathode compartment to the outer current collector.

In accordance with the teachings of a preferred embodiment of this invention, an outer metal pipe 12 formed from AISI 1018 steel is selected. This pipe has a two inch outside diamter with a 0.039 inch wall thickness. This is a standard type pipe that may be purchased from many sources. A graphite pipe 14 is also obtained. This graphite pipe is purchased from Union Carbide as Grade CJB Graphite Pipe. This is a very commonly used material, although it is somewhat porous. This pipe generally has a 1½ inch inside diameter and a 2-inch outside diameter.

In accordance with the teachings of the method of this invention, the outside diameter of the graphite pipe 14 is machined to provide an interference of 0.005 inches to 0.010 inches with the inside diameter of the steel pipe. In accordance with the preferred embodiment of this invention, the length of the graphite liner and steel tube was in a range of from 10 to 11 inches.

Assembly of the graphite pipe 14 into the outer metal pipe 12 is as follows. The steel pipe is heated to 650° C. in an air furnace. After allowing the temperature to come to equilibrium for a period of five minutes, the steel pipe is removed from the furnace and rapidly slipped over the graphite pipe 14. It is, of course, apparent that heating of the steel pipe causes an expansion thereof so that its internal diameter is greater than the internal diameter thereof when in a cool condition. The slipping of the outer metal pipe 12 over the graphite pipe 14 must be accomplished quickly to prevent excessive cooling of the outer metal pipe 12 prior to its being slipped over the graphite pipe.

Upon cooling of the metal pipe 12 to room temperature, the inside diameter of the metal pipe will come into intimate contact with the machined outside diameter of the graphite pipe. This intimate contact between the two facing surfaces is maintained over a substantial range of temperatures and, in particular, is maintained at the operating temperatures of the battery in which is in the range of 300° to 400° C.

After the combined elements have been cooled, the inside diamter of the graphite pipe is machined to reduce the thickness of the graphite pipe 14 to a desired thickness. For example, the wall thickness in the final embodiment shown in FIG. 2 of the graphite pipe 14 may be in the order of 0.050 inches to 0.100 inches.

As best seen in FIG. 3, after the inside diameter of the porous graphite pipe 14 has been machined, it is coated with a sealant material. The purpose of this coating action is to close off the porosity of the graphite pipe so that the corrosive reactant materials which come in contact therewith will not seep through the graphite pipe and react with the outer metal pipe 12. A material which may be used for this coating function would be a colloidal graphite suspension sush as sold under the name Elctrodag 131. This material is applied liberally to the interior diameter of the graphite pipe 14 and allowed to dry in order to develop a tenaciously adherent coating film 16.

As is best understood by reference to FIG. 2, the portion of the sodium sulfur container formed by the method of this ivention is that portion which will confine the cathodic reactant materials 18 therewithin. The cathodic reactant materials 18 are confined between the side walls of the graphite pipe 14 which have a coating film 16 thereon, a bottom closure member 20 which may be formed in a manner similar to the pipe, and a sodium electrolyte material 22, as is well known in the art. A sodium anode compartment 24 is also provided. During operation, on the discharge cycle thereof, sodium in the anode compartment gives up an electron to the external circuit and the resulting sodium ion passes through the sodium electrolyte 22 into the cathode reactant 18. At this point, the sodium forms a sodium polysulfide reaction product, that reaction product being the corrosive material to be protected against by the graphite container.

Upon charge of the battery, as is well known in the art, the sodium polysulfide material gives up electrons to the external circuit thus permitting sodium ions to migrate through the sodium electrolyte back into the anode compartment 24 where they are reunited with the electrons to form elemental sodium. The operation of such a sodium sulfur battery is well known in the art.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. A method of making a sodium sulfur battery which comprises:
    selecting a steel pipe having a predetermined inside diameter;
    selecting a porous graphite pipe having an outside diameter greater than said predetermined inside diameter of said steel pipe;
    machining said outside diameter of said graphite pipe to a diameter in the range of 0.005 inches to 0.010 inches greater than said predetermined inside diameter of said steel pipe;
    heating said steel pipe so as to expand the same so that the inside diameter is greater than said predetermined inside diameter when in a heated condition;
    slipping said heated steel pipe over said machined graphite pipe;
    cooling said heated steel pipe to room temperature so that the inside diameter thereof comes into intimate contact with said machined outside diameter of said graphite pipe;
    machining the inside diameter of said graphite pipe to reduce the thickness of said graphite pipe to a selected thickness;
    coating the inside diameter of said relatively porous graphite pipe with a sealant material to close off the porosity of said graphite pipe from the internal diameter thereof thereby forming a portion of the sodium sulfur battery container; and
    providing the container with cathodic reactant material, sodium electrolyte material and a sodium anode compartment so as to form said sodium sulfur battery.

2. The method of claim 1 wherein: said steel pipe is formed of AISI 1018 material.

3. The method of claim 1 wherein: said sealant material is a colloidal graphite based material.

* * * * *